(12) United States Patent
Wolfe

(10) Patent No.: US 7,157,010 B1
(45) Date of Patent: Jan. 2, 2007

(54) POLYMERIC FLOCCULANT INFUSED SILT FENCE

(75) Inventor: Kevin B. Wolfe, Nashville, TN (US)

(73) Assignee: Civil & Environmental Consultants, Inc., Nashville, TN (US)

( * ) Notice: Subject to any disclaimer, the term of this patent is extended or adjusted under 35 U.S.C. 154(b) by 38 days.

(21) Appl. No.: 10/780,791

(22) Filed: Feb. 18, 2004

(51) Int. Cl.
C02F 1/56 (2006.01)

(52) U.S. Cl. ............... 210/734; 210/702; 210/747; 405/74; 405/107

(58) Field of Classification Search ........... 210/702, 210/734
See application file for complete search history.

(56) References Cited

U.S. PATENT DOCUMENTS

| | | | | |
|---|---|---|---|---|
| 3,839,202 A | * | 10/1974 | Roy | 210/732 |
| 4,955,760 A | | 9/1990 | Payne | 405/270 |
| 5,062,740 A | | 11/1991 | Payne | 405/270 |
| 5,201,497 A | | 4/1993 | Williams et al. | 256/12.5 |
| 5,346,565 A | | 9/1994 | White | 156/71 |
| 5,346,566 A | | 9/1994 | White | 156/71 |
| 5,401,118 A | | 3/1995 | Kramer | 405/129 |
| 5,584,601 A | | 12/1996 | Hagn et al. | 405/30 |
| 5,584,609 A | | 12/1996 | Clarey et al. | 405/270 |
| 6,042,733 A | * | 3/2000 | Tucker | 210/747 |
| 6,190,088 B1 | * | 2/2001 | Van Der Hidde et al. | 405/19 |
| 6,258,261 B1 | * | 7/2001 | Zaluski et al. | 210/170 |
| 6,290,637 B1 | * | 9/2001 | Eighmy | 588/256 |
| 6,332,737 B1 | * | 12/2001 | Mattson | 405/63 |
| 6,524,029 B1 | | 2/2003 | Nobert et al. | 405/129.8 |
| 6,660,170 B1 | * | 12/2003 | Dreyer et al. | 210/747 |
| 6,669,407 B1 | | 12/2003 | Markusch et al. | 405/184.2 |
| 6,783,802 B1 | * | 8/2004 | Darlington et al. | 427/333 |
| 6,821,427 B1 | * | 11/2004 | Macpherson et al. | 210/631 |
| 6,852,813 B1 | * | 2/2005 | Darlington et al. | 526/223 |
| 6,863,826 B1 | * | 3/2005 | Sheets | 210/705 |
| 6,905,289 B1 | * | 6/2005 | Sanguinetti | 405/302.6 |

OTHER PUBLICATIONS http://www.terratubes.com/_pdfs/terratubes/terratubes.pdf.

* cited by examiner

*Primary Examiner*—Peter A. Hruskoci
(74) *Attorney, Agent, or Firm*—Waddey & Patterson, P.C.; Mark J. Patterson; Howard H. Bayless

(57) ABSTRACT

A polymeric flocculant infused silt fence assembly comprising two opposing and attached geo-textile sheets, each adapted to filter entrained non-colloidal particles and together encasing a layer of polymeric flocculant material. In a preferred embodiment the polymeric flocculant material comprises anionic polyarylmide. A turbid water flow having a suspension of colloidal particles is flowed through the first geo-fabric sheet, which filters any entrained non-colloidal particles. The polymeric flocculant material coagulates a portion of the colloidal particles and forms flocs. The second geo-fabric sheet filters remaining entrained non-colloidal particles, including the coagulated flocs.

8 Claims, 4 Drawing Sheets

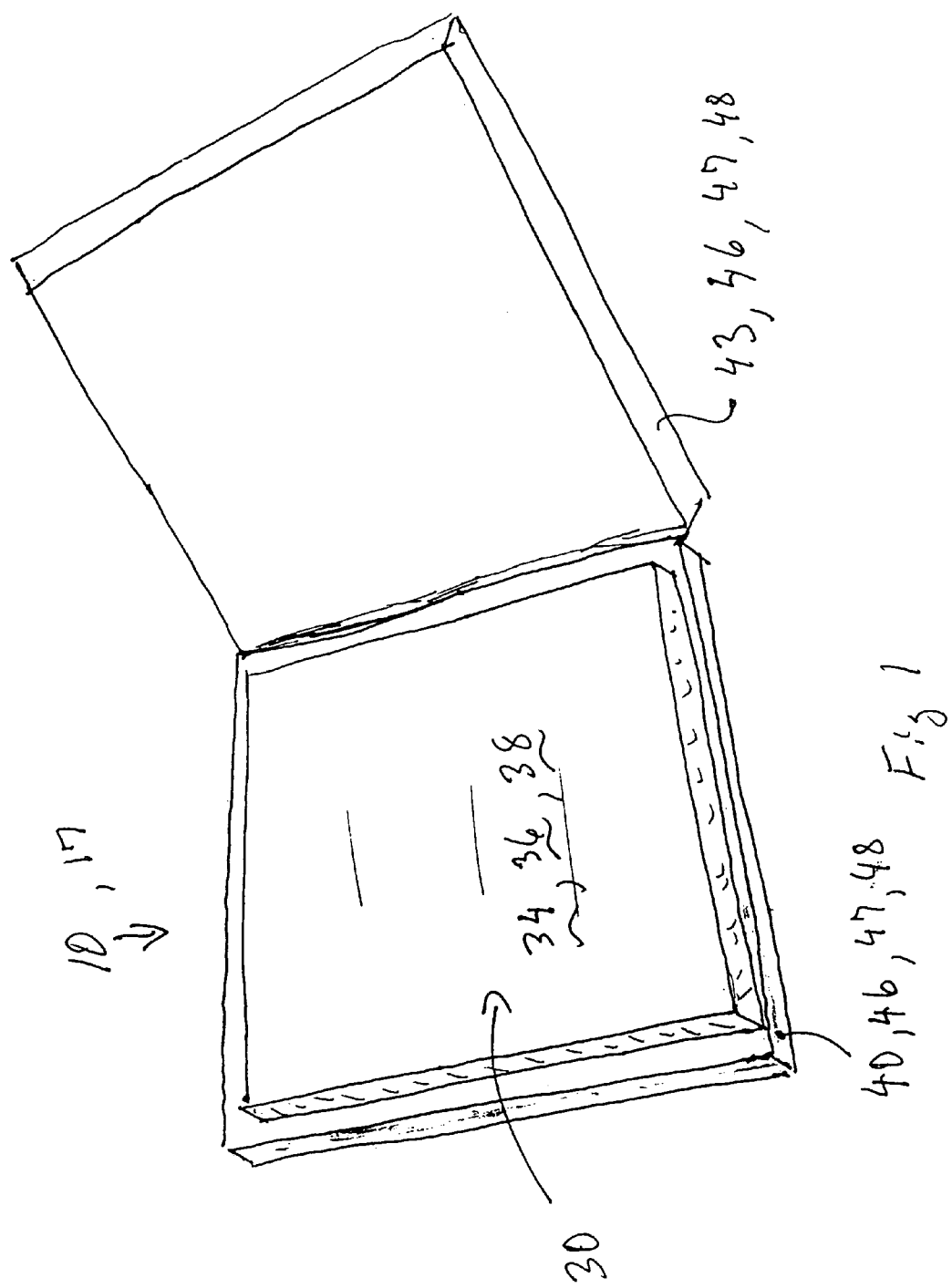

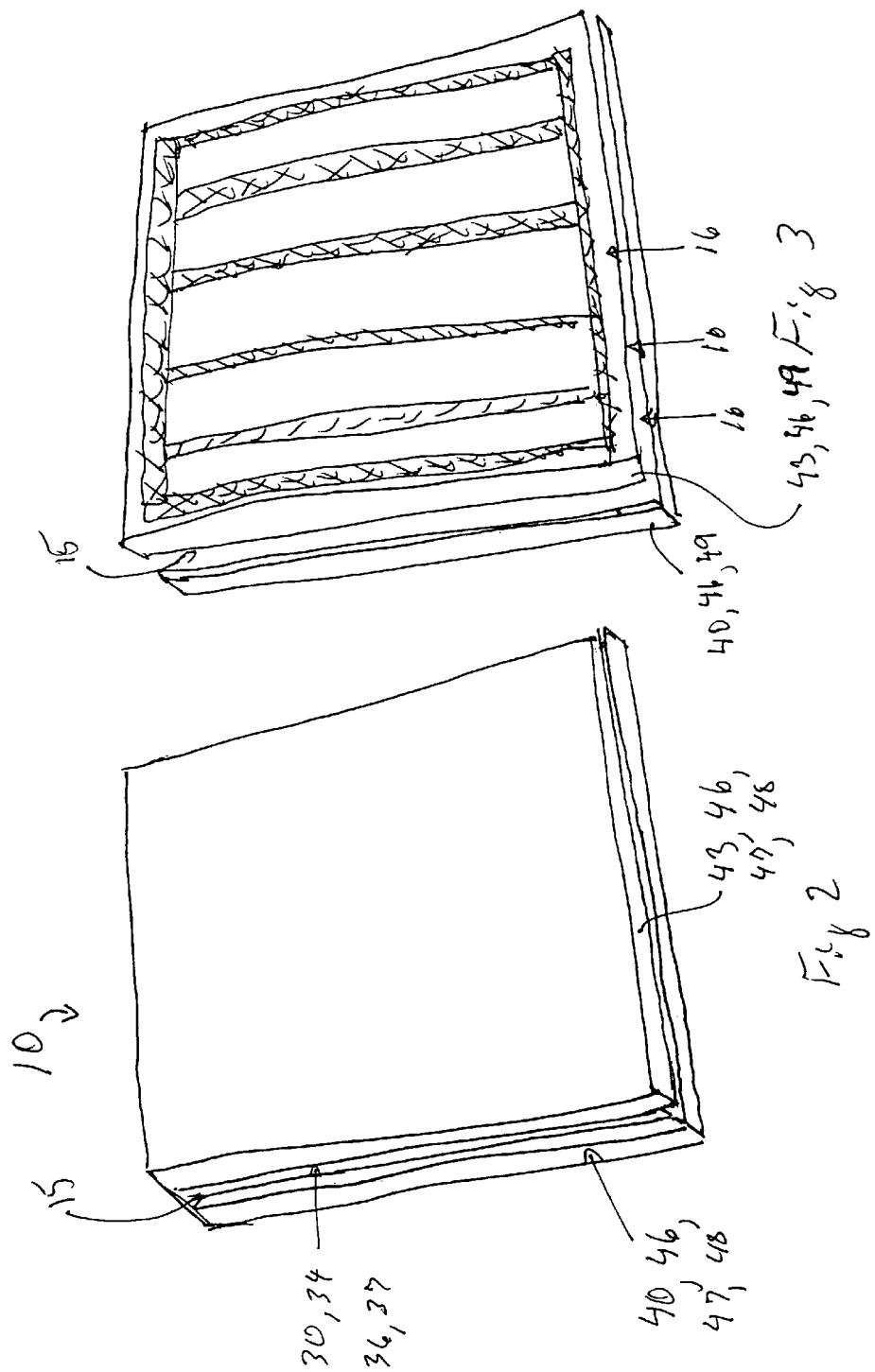

POLYMERIC FLOCCULANT INFUSED SILT FENCE

BACKGROUND OF THE INVENTION

The present invention relates generally to sediment control barrier systems and relates more particularly to filtration barriers for waterborne silt and to methods and apparatus for installing the silt filtration barriers.

Sediment control barrier systems have a variety of uses and a wide range of industrial applications. They include: protection of surface soils from surface water erosion; the trapping of sediment; and run-off water filtration for improving water quality and for preventing waterborne silts and solids from entering channeled streams and drainage control systems. A wide variety of materials and structures are used in sediment control barriers systems and in geo-barrier systems in general. Since terminology is somewhat non-standardized, the following terms are defined herein. The term 'geo-fabric' refers to a geo-textile, a geo-membrane or a geo-grid structure, or to a combination of thereof. The term 'geo-textile' refers to a woven, non-woven, or knitted, biodegradable-resistant fabric that is sufficiently porous as to allow movement of air and water. Geo-textiles are typically load-bearing, synthetic fabrics used as a filter to prevent the passing of fine grained material such as silt or clay. The term 'geo-grid' refers to biodegradable-resistant material manufactured into an open, lattice like sheet configuration. Geo-grids are typically made of plastic and used as a reinforcing structure. The term 'geo-membrane' refers to essentially impermeable polymeric sheets. Geo-membranes are typically used as hydraulic barriers in liner and cover systems.

Sediment control barriers include silt fences constructed of filtering fabrics, support posts and wire fences. These silt fences typically are single vertical barriers made from a fabric supported in an upright position by posts and support mesh. Silt fences are frequently temporary sediment barriers made of woven synthetic filtration fabric supported by steel or wooden posts. Silt fences prevent sediments carried by un-channeled flow, or sheet flow, of rainwater from leaving a ground site and either entering natural drainage channels or entering waste and storm drain systems. The barriers slow the runoff sheet flow and frequently create a ponding of water upstream of the silt fence. The reduction in water velocity causes the larger entrained soil particles to settle to the ground surface upstream of the silt fence. A silt fence constructed of permeable geo-textile sheets creates a filtration barrier that filters suspended silt particles as the low velocity or ponded water passes through the silt fence to form an effluent stream. The filtered silt particles are shed from the vertical fabric barrier surface or the standard silt fence and accumulate at its base. The size of openings in the barrier determines the size of the particles filtered. The size, shape and number of the openings, as well as the height of the ponded water, determine the flow rate of the filtered effluent stream.

Un-channeled surface water that is deposited upon ground having a sloped surface moves by gravity directed flow along paths determined by the contour of the ground surface. Typically, a silt fence is installed along a path spanning the sloped ground surface or along a path spanning beneath such a slope. The installation path is selected such that it is transverse to the water flow path and impedes the flow. Since sheet flow run-off is stored upstream of a silt fence, the slope grade and the slope length determine the hydraulic load experienced by the silt fence. A maximum recommended slope length upstream of an installed silt fence is determined based on the mechanical strength of the silt fence assembly, the flow rate through the barrier and the volume of water per unit slope area per unit time expected to be deposited upon the slope.

A standard silt fence assembly consists of a woven geo-textile sheet stapled to a series of long wooden stakes. The typical length of the stakes is 48 inches and the stakes are typically made of a hardwood. The stakes are installed at intervals of from 4 to 6 feet and are driven into the ground along a selected path typically over a contour of the surface transverse to the path of ground water run-off. Frequently a portion of geo-textile sheet extends beyond the ground surface as a ground skirt. The ground skirt can either lie on the ground surface in front of the barrier or can be buried in a trench in front of the barrier. The purpose of the ground skirt is to prevent the ponded water from freely flowing beneath the silt fence. Such flows would greatly reduce the effectiveness of the barrier and would tend to erode the ground surface that supports the barrier.

There are a variety of problems associated with standard silt fencing installations. One problem is that standard silt fences cannot effectively filter silt particles that are substantially smaller than the size of the openings in the woven geo-textile sheets. Different types of ground surfaces, when eroded by water runoff, produce different types and sizes of entrained and dissolved sediment particles. Clay soils in particular produce very finely divided silt particles, including suspended particles that are much smaller than the average apparent opening size of between US Standard Sieve size number 20 and US Standard Sieve size number 40, which is a typical range of sizes for standard silt fence fabrics.

Where a standard silt fence is used to filter storm water runoff containing very finely divided silt particles, the silt fence effluent remains turbid, retaining significant portions of the runoffs suspended particles, including colloidal particles such as colloidal clay silt. Besides being aesthetically unpleasant, such turbid effluent can produce significant ecological hazards if allowed to enter surrounding streams, lakes or wetlands, including depletion of dissolved oxygen, reduced photo-penetration depths, and covering of benthic aquatic organisms.

One method known in the art to overcome silt fence filtering limitations is to substantially slow or even pond runoff water to allow waterborne silt particles entrained in the water flow of the runoff to fall out of the water stream and be deposited on the submerged ground surface prior to reaching the silt fence. While effective for larger, entrained particles, this method is much less effective for quasi-colloids, quasi-colloids herein defined as very small entrained particles that require significant amount of time in low velocity conditions to settle out of the runoff water. Ponding and settling is virtually ineffective in removing suspended particles such as colloids and quasi-colloids.

A method that is effective in removing suspended colloids from storm runoff and waste water is to pool the water into basins and seed the water with flocculants. The flocculants react with the colloids to form flocs that settle from the basin waters. However, flocculant treatments require the water to be channeled and, preferably, not flowing. Where the water is not channeled, such as storm runoff deposited upon an un-channeled ground surface, the standard flocculant treatments have only a limited effectiveness. Also, standard flocculant treatments do not efficiently remove suspended particles from channeled but flowing runoff or waste streams without diversion into catchment basins.

A final method of removing suspended particles such as colloidal silts is to force the water runoff through mechanical filters of sufficiently small size as to remove the suspended particles. This method is impractical because of many factors, including the low mechanical strength of such filters, the very long filtration time required, and the high cost of such a system.

What is needed then is a silt fence system that can intercept an un-channeled water flow, efficiently treat the water flow with flocculants, and remove the resulting flocs.

Additionally, what is needed is a silt fence assembly that has a flocculant treatment capacity and is as durable and as simple to install as a standard silt fence.

BRIEF SUMMARY OF THE INVENTION

One preferred embodiment of this invention is a polymeric flocculant infused silt fence assembly constructed by attaching a first geo-textile sheet to a second geo-textile sheet so as to form a series of cavities. A polymeric flocculant material is placed in the cavities. The two geo-textile sheets are made from non-woven geo-textile or a heat-bonded geo-textile. The geo-textile sheets have holes sized to filter entrained non-colloidal particles, such as non-colloidal silt, as water runoff is flowed through the assembly of the two sheets and flocculant. In one preferred embodiment the polymeric flocculant material is anionic polyacrylamide.

The assembly of the two sheets and flocculant is attached to a support frame to form a silt fence barrier. The silt fence barrier is positioned across a ground surface to intercept a surface water runoff. A turbid water flow having a suspension of colloidal particles, including colloidal silt, is flowed through the first geo-textile sheet. The first geo-textile sheet filters any entrained non-colloidal particles from the water flow. As the water flow enters the cavities of the assembly, the polymeric flocculant material coagulates the colloidal particles and forms silt flocs. The second geo-textile sheet then filters remaining entrained non-colloidal particles, including the now coagulated flocs.

BRIEF DESCRIPTION OF THE SEVERAL VIEWS OF THE DRAWINGS

FIG. 1 is an above oblique perspective showing one embodiment of an unassembled polymeric flocculant infused geo-fabric assembly.

FIG. 2 is an above oblique perspective showing one embodiment of a polymeric flocculant infused geo-fabric assembly.

FIG. 3 is an above oblique perspective showing one embodiment of a polymeric flocculant infused geo-fabric assembly having pockets of polymeric flocculant.

DETAILED DESCRIPTION OF THE INVENTION

Figure 4:
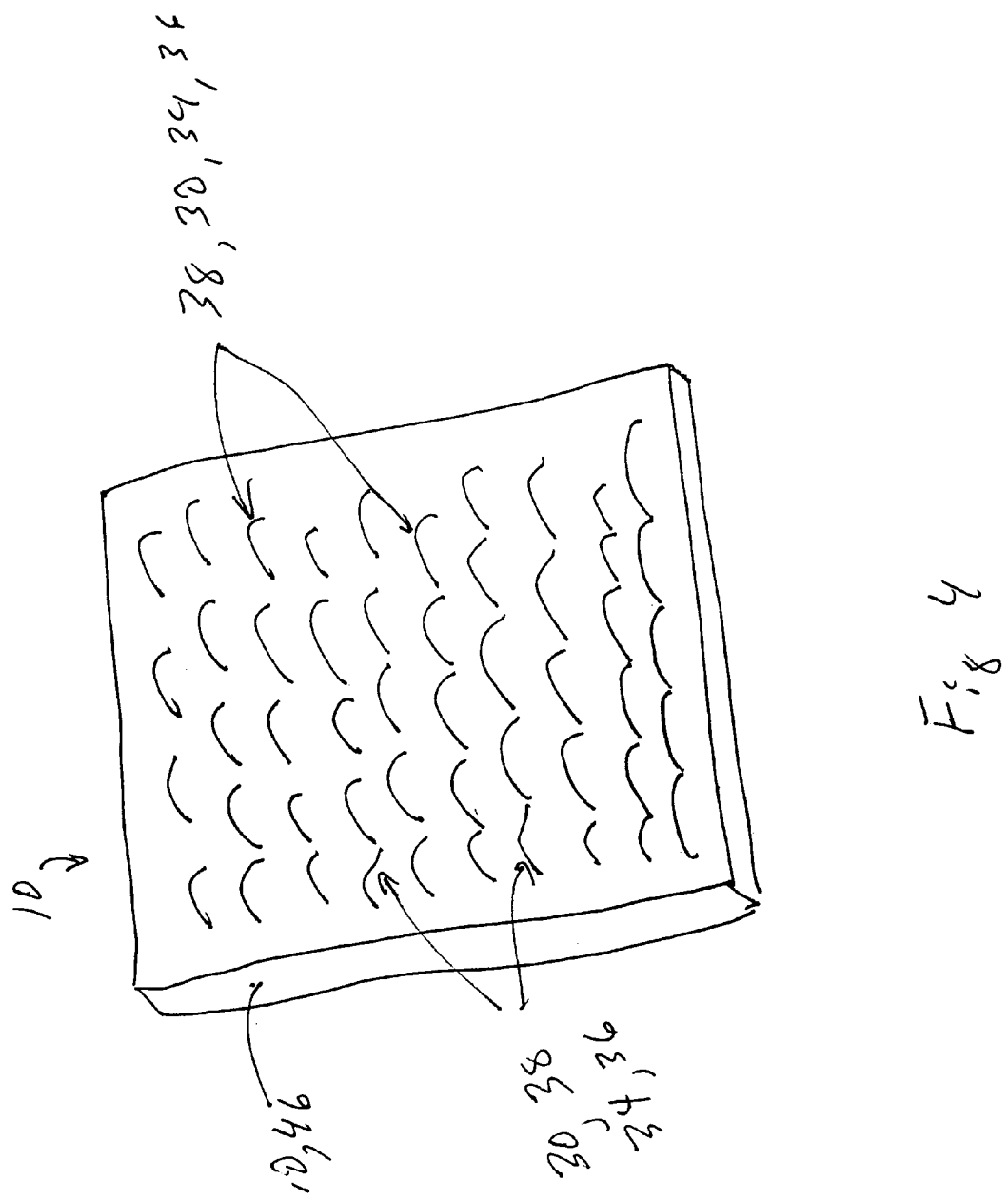
FIG. 4 is an above oblique perspective showing one embodiment of a polymeric flocculant infused geo-fabric sheet.

FIG. 1 shows an unassembled polymeric flocculant infused geo-fabric assembly 10 of one embodiment of the present invention. The geo-fabric assembly 10 includes a first geo-fabric sheet 40 and a second geo-fabric sheet 43. Referring now to FIG. 2, the first geo-fabric sheet 40 and the second geo-fabric sheet 43 are assembled so as to form at least one cavity 15 disposed between the two sheets 40, 43. The geo-fabric assembly 10 further includes a flocculant material 30 disposed within the cavity 15.

The first geo-fabric sheet 40 and the second geo-fabric sheet 43 are adapted to filter entrained non-colloidal particles, including non-colloidal silt, from a flow of water. Referring now to FIGS. 1 and 2, the first geo-fabric sheet 40 and the second geo-fabric sheet 43 each are made from a geo-textile 46. The geo-textile 46 of either sheet is preferably a non-woven geo-textile 47 or a heat-bonded geo-textile 49. In the embodiments of FIGS. 1 and 2, the first geo-fabric sheet 40 and the second geo-fabric sheet 43 each comprise a non-woven geo-textile 47, and more specifically a needle-punched, non-woven geo-textile 48. Referring now to FIG. 3, an alternate embodiment is shown wherein the first geo-fabric sheet 40 and the second geo-fabric sheet 43 are made from a heat-bonded geo-textile 49. Referring again to FIGS. 1 and 2, the needle-punched, non-woven geo-textile 48 of these embodiments is common for conventional silt fence application in that the fabric has an average apparent opening size of between US Standard Sieve size number 20 and US Standard Sieve size number 40. While this range of average apparent opening size is suitable to filter entrained non-colloidal silt from a flow of water, it is ineffective in filtering colloidal silt.

FIGS. 1, 2 and 3 further show a flocculant material 30 disposed between the first geo-fabric sheet 40 and the second geo-fabric sheet 43 within either a single cavity 15, as shown in FIGS. 1 and 2, or within multiple cavities 15 or pockets 16. The flocculant material 30 is reactive with waterborne colloidal particles, including colloidal silt, and will cause waterborne colloidal particles to coagulate and form flocs. These flocs will be several magnitudes larger than the size of the colloidal particles and are large enough to be filtered by either the needle-punched, non-woven geo-textile 48 or the heat-bonded geo-textile 49 of the embodiments of FIGS. 1, 2 or 3. The flocculent material 30 of the embodiments of FIGS. 1, 2 and 3 can be a polymeric flocculant material 34 selected from various polymeric flocculants. In the embodiments of FIGS. 1, 2 and 3 the polymeric flocculant material 34 comprises anionic polyacrylamide 36.

FIG. 4 shows an alternative embodiment of the present invention using a single geo-fabric sheet 40. In this embodiment, a geo-fabric assembly 10 includes a first geo-fabric sheet 40 of a geo-textile 46 having a flocculant material 30 disposed within the geo-textile 46 of the first geo-fabric sheet 40. The flocculant material 30 is formed of dry polymeric flocculant particles 38 which are interwoven into the geo-textile 46 such that the greatest portion of flocculant material 30 is exposed on one side of the first geo-fabric sheet 40. The dry polymeric flocculant particles 38 may be selected from various polymeric flocculant materials 34. In this embodiment the dry polymeric flocculant particles 38 are anionic polyarylmide 36. The geo-textile 46 is a needle-punched, non-woven geo-textile 48 of roughly double the thickness and unit weight of the geo-textiles 46 shown in FIGS. 1, 2 and 3. In employing this embodiment to filter colloidal silt from a water flow, the side of the geo-fabric sheet 40 having the greatest portion of flocculant material 30 exposed is oriented into the influent stream. The flocculant material 30 will cause waterborne colloidal particles to coagulate and form flocs. These flocs will be of several magnitudes the size of colloidal particles and are large enough to be filtered by the geo-fabric sheet 40.

Referring again to FIG. 1, the polymeric flocculant infused geo-fabric assembly 10 is shown at an early step of manufacture. A first geo-fabric sheet 40 is spread over a working surface. A layer of dry polymeric flocculant particles 38, such as anionic polyarylmide 36, is then applied evenly upon the first geo-fabric sheet 40 such that the layer of dry polymeric flocculant particles 38 has an average weight per area of covered geo-fabric of at least 0.02 pounds per square foot and, preferably, 0.04 pounds per square foot. Next, a second geo-fabric sheet 43 is spread over the first geo-fabric sheet 40 and the layer of dry polymeric flocculant particles 38 to form an un-affixed geo-fabric assembly 17. The un-affixed geo-fabric assembly 17 is compressed a first time. The polymeric flocculant material 34 is hydrated by wetting the un-affixed geo-fabric assembly 17. The wetted un-affixed geo-fabric assembly is then compressed a second time so as to minimize variations in the thickness of the hydrated polymeric flocculant material over the wetted, un-affixed geo-fabric assembly. Referring now to FIGS. 2 and 3, the second geo-fabric sheet 43 is mechanically affixed to the first geo-fabric sheet 40, forming a single geo-fabric assembly 10. Sewing, stapling, 'hog-ring', tape or other standard method of attachment may be employed as necessary. Where desired, a woven wire backing 19 may mechanically affixed to either the first geo-fabric sheet 40 or the second geo-fabric sheet 43 so as to adapt the geo-fabric assembly 10 for attachment to a standard silt fence assembly by wire ties. Otherwise, the geo-fabric assembly is attachable to a standard silt fence assembly by staples or wire ties.

Referring now to FIG. 3, an alternative method of manufacture is illustrated in that following the step of initial compression of un-affixed geo-fabric assembly 17 in the method of manufacture supra, the second geo-fabric sheet 43 is affixed the first geo-fabric sheet 40 so as to form pockets 16 containing portions of the dry polymeric flocculant particles 38. The dry polymeric flocculant particles 38 are then be hydrated by wetting of the geo-fabric assembly 10. The wetted geo-fabric assembly is then compressed a second time so as to minimize variations in the thickness of the hydrated polymeric flocculant material within the pockets 16. This method is advantageous because it allows a geo-fabric assembly 10 with dry polymeric flocculant particles 38 to be transported to the installation site before wetting.

Referring again to FIG. 1, yet another alternate method of manufacture of the polymeric flocculent infused geo-fabric assembly 10 is shown at an early step of manufacture. Again, a first geo-fabric sheet 40 is spread over a working surface. A layer of a liquid emulsion of polymeric flocculant materials 34, such as anionic polyacrylamide 36, is then applied evenly upon the first geo-fabric sheet 40. Next, a second geo-fabric sheet 43 is spread over the first geo-fabric sheet 40 and the layer of liquid emulsion of polymeric flocculant materials 34 to form an un-affixed geo-fabric assembly 17. The un-affixed geo-fabric assembly 17 is compressed so as to minimize variations in the thickness of the layer of liquid emulsion over the un-affixed geo-fabric assembly 17. Referring now to FIGS. 2 and 3, the second geo-fabric sheet 43 is mechanically affixed to the first geo-fabric sheet 40 to form a single geo-fabric assembly 10 by sewing, stapling, 'hog-ring', tape or other standard method of attachment.

Figure 5:
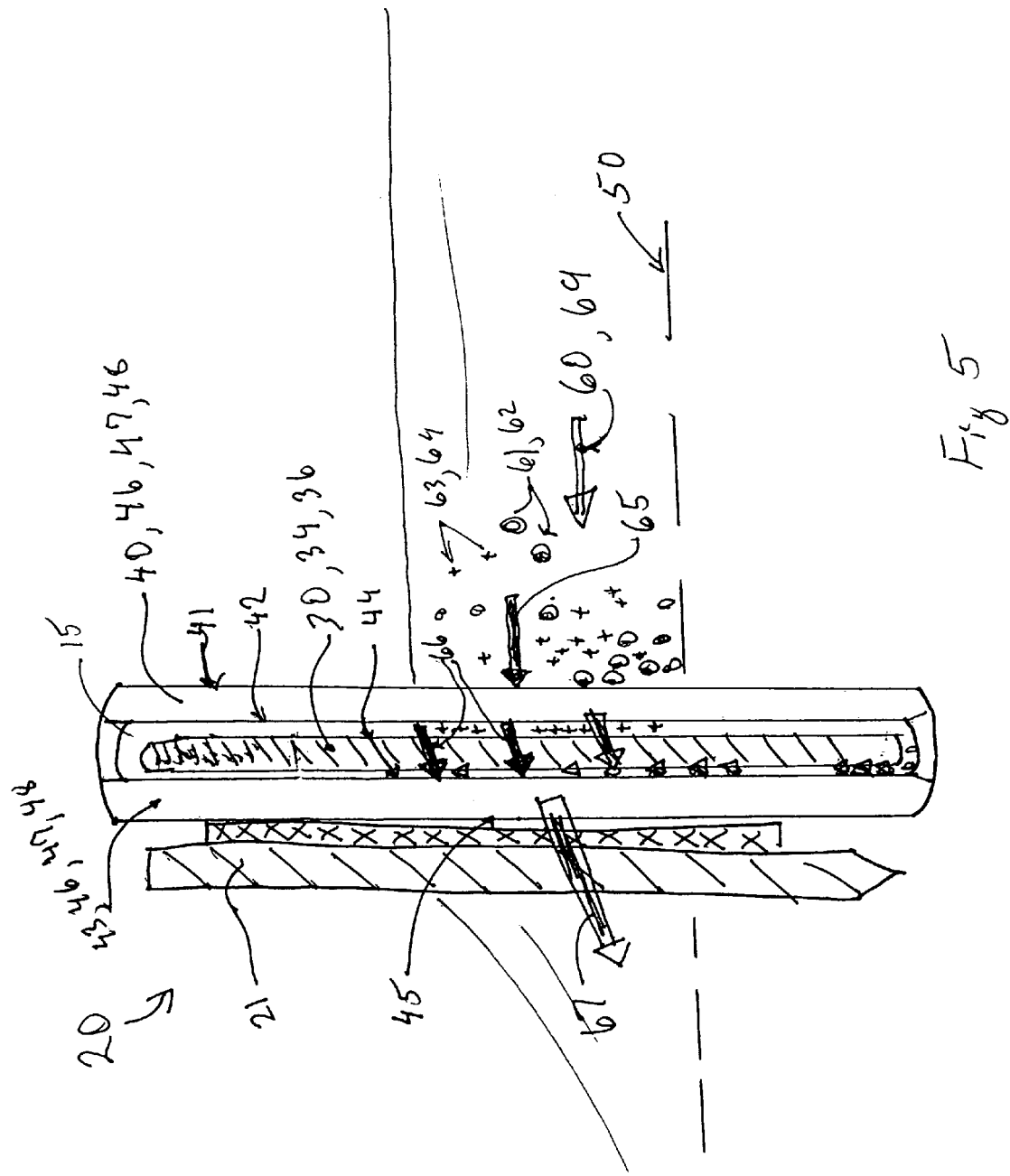
FIG. 5 is a cross-sectional perspective showing a filtration barrier comprising a polymeric flocculant infused geo-fabric assembly installed so as to intercept an un-channeled water flow having suspended particles.

Referring now to FIG. 5, a filtration barrier 20 is shown impeding a water flow 60. The filtration barrier 20 has a support frame 21 embedded within a ground surface 50. The filtration barrier 20 further includes a first geo-fabric sheet 40 and a second geo-fabric sheet 43, each having openings sized to filter entrained non-colloidal particles 61 from a flow of water 60. The first geo-fabric sheet 40 is shown having an influent filtering surface 41 and an interior surface 42. The second geo-fabric sheet 43 is shown having a floc filtering surface 44 and an effluent surface 45. The second geo-fabric sheet 43 is attached to the first geo-fabric sheet 40 and form at least one cavity 15 defined by the interior surface 42 and the floc filtering surface 44. A flocculant material 30 is shown within the cavity 15 and a woven wire backing connects the geo-fabric sheets to the support frame 21.

In the embodiment shown in FIG. 5, the flocculant material 30 is a polymeric flocculant material 34. In alternative embodiments, the polymeric flocculant material 34 is anionic polyacrylamide 36. In the embodiment shown in FIG. 5, at least one of the first and second geo-fabric sheets 40, 43 is made from a geo-textile 46, and more specifically a non-woven geo-textile 47, such as a needle-punched, non-woven geo-textile 48. In an alternative embodiment, the geo-textile 46 is a heat-bonded geo-textile 49.

FIG. 5 shows the filtration barrier 20 positioned transverse to the water flow 60. The water flow 60 is shown having entrained non-colloidal particles 61, including non-colloidal silt 62. The water flow 60 is also shown having a suspension of colloidal particles 63, including colloidal silt 64. An influent stream 65 is formed from the water flow 60 and moves through the influent filtering surface 41 of the first geo-fabric sheet 40. The influent filtering surface 41 filters the entrained non-colloidal particles 61, including non-colloidal silt 62 from the influent stream 65 so as to form a treatment stream 66 flowing within the cavity 15. The treatment stream 66 in the region leaving the interior surface 42 contains a suspension of colloidal particles 63, including colloidal silt 64 but is relatively free of non-colloidal particles 61. The treatment stream 66 is flowed through flocculant material 30. The flocculant material coagulates a portion of the colloidal particles 63, including colloidal silt 64, and forms flocs 32. These flocs 32 are several orders of magnitude larger than the colloidal particles 63. Sufficiently large flocs 32 may settle out of the treatment stream 66 within the cavity 15 volume or may be filtered from the treatment stream 66 by the flocculent material 30. The remainder of the flocs 32 formed within the flocculant material 30 is entrained in the treatment stream 66 and transported to the second geo-fabric sheet 43. The treatment stream 66 is then flowed through the floc filtering surface 44 of the second geo-fabric sheet 43. The floc filtering surface 44 filters the entrained non-colloidal particles 61, including the flocs 32, from the treatment stream 66 so as to form an effluent stream 67 flowing from the effluent surface 45.

In an alternate method employing an alternate embodiment of the filtration barrier 20 shown in FIG. 5, the first geo-fabric sheet 40 is not adapted to filter entrained non-colloidal particles 61 from a flow of water 60, but allows significant portions of the entrained non-colloidal silt 62 to pass into the cavity 15. In the alternate method, the steps of filtering of the non-colloidal particles 61 and the flocs 32 are performed in a single step of flowing the treatment stream 66 through the floc filtering surface 44 of the second geo-fabric sheet 43.

FIG. 5 shows the filtration barrier 20 positioned transverse to the water flow 60. The water flow 60 shown comprise an un-channeled water flow 69 of surface water runoff on a sloped ground surface 50 which flows by gravity directed flow along paths determined by the contour of the ground surface 50. The filtration barrier 20 is positioned along a path spanning across the sloped ground surface 50 so as to intercept the un-channeled water flow 69. Thus, FIG. 5 shows a silt fence assembly that can intercept an un-channeled water flow, efficiently treat the water flow with flocculants, and remove the resulting flocs. FIG. 5 also shows a silt fence assembly that has a flocculant treatment capacity and is as durable and is as simple to install as a standard silt fence.

It will now be apparent to one of skill in the art that an alternative method to that illustrated in FIG. 5 is to position the filtration barrier 20 of FIG. 5 transverse to a channeled water flow of turbid water such that the filtration barrier forms a permeable dam that spans the breath of the channel. For small channeled water flow such as drainage ditches or waste canals, this alternative method provides a practical means to intercept a channeled water flow, efficiently treat the water flow with flocculants and remove the resulting flocs.

Thus, although there have been described particular embodiments of the present invention of a new and useful Polymeric Flocculant Infused Silt Fence, and methods of making and using the same, it is not intended that such references be construed as limitations upon the scope of this invention except as set forth in the following claims.

What is claimed is:

1. A method of filtering colloidal silt from a water flow, the method comprising the steps of:
    (a) providing a filtration barrier for impeding a water flow, the filtration barrier comprising:
        a support frame;
        a first geo-fabric sheet, the first geo-fabric sheet having an influent filtering surface and an interior surface;
        a second geo-fabric sheet, the second geo-fabric sheet adapted to filter entrained non-colloidal particles from a flow of water, the second geo-fabric sheet having an floc filtering surface and an effluent surface the second geo-fabric sheet fixedly disposed adjacent to the first geo-fabric sheet such that the interior surface and the floc filtering surface form at least one cavity; and
        a flocculant material, the flocculant material disposed within the at least one cavity, the flocculant material reactive with waterborne colloidal particles so as to cause waterborne colloidal particles to coagulate and form flocs, wherein at least one of the first and second geo-fabric sheets is affixed to the support frame so as to form a filtration barrier;
    (b) positioning the filtration barrier transverse to the water flow so as to form an influent stream of water flow directed through the influent surface and so as to form a corresponding effluent stream of water flow emitted from the effluent surface, the influent stream comprising colloidal silt;
    (c) flowing the influent stream through the influent surface so as to form a treatment stream;
    (d) flowing the treatment stream through the flocculant material so as to coagulate a portion of the colloidal silt and form flocs; and
    (e) flowing the treatment stream through the floc filtering surface so as to remove at least a portion of the flocs and to form an effluent stream.

2. The method of claim 1, wherein the first geo-fabric sheet is adapted to filter entrained non-colloidal particles from a flow of water, and wherein the influent stream further comprises non-colloidal silt, the step (c) further comprising:
    flowing the influent stream through the influent surface so as to remove non-colloidal silt.

3. The method of claim 1, wherein the water flow comprises an un-channeled water flow across a ground surface.

4. The method of claim 1, wherein the water flow comprises a channeled water flow.

5. A method of filtering colloidal silt from a water flow, the method comprising the steps of:
    (a) providing a filtration barrier comprising:
        first and second geo-fabric sheets forming at least one cavity; and
        a flocculent material disposed within said at least one cavity;
    (b) positioning the filtration barrier transverse to a water flow comprising a colloidal silt;
    (c) flowing at least a portion of the water flow through the flocculant material so as to coagulate a portion of the colloidal silt and form flocs; and
    (e) filtering the flocs by means of the second geo-fabric sheet.

6. The method of claim 5, wherein at least one geo-fabric sheet comprises a geo-textile material.

7. The method of claim 5, wherein the flocculant material comprises a polymeric flocculant material.

8. The method of claim 7, wherein the polymeric flocculant material comprises a hydrated polymeric flocculant material.

* * * * *